United States Patent [19]

Lukey

[11] 4,145,023
[45] Mar. 20, 1979

[54] VEHICLE MIRRORS

[75] Inventor: Leonard F. Lukey, Mentone, Australia

[73] Assignee: Fifth Patroy Proprietory Ltd., Melbourne, Australia

[21] Appl. No.: 841,198

[22] Filed: Oct. 11, 1977

[30] Foreign Application Priority Data

Oct. 12, 1976 [AU] Australia ............................. PC7690

[51] Int. Cl.² ............................................. B60R 1/02
[52] U.S. Cl. .................................... 248/479; 248/364
[58] Field of Search ............... 248/364, 479, 481, 482, 248/483, 484, 485, 486, 487; 350/307

[56] References Cited

U.S. PATENT DOCUMENTS

| | | | |
|---|---|---|---|
| 1,828,804 | 10/1931 | Horton | 248/479 |
| 2,486,105 | 10/1949 | Bonar | 248/479 |
| 2,600,893 | 6/1952 | Mariani | 248/487 X |
| 2,614,363 | 10/1952 | Bowditch | 248/481 X |
| 2,856,815 | 10/1958 | Ross | 248/483 |
| 3,236,152 | 2/1966 | Alford | 248/481 |
| 3,286,545 | 11/1966 | Malachowski | 248/483 X |
| 3,383,154 | 5/1968 | Reed | 248/479 X |
| 3,416,854 | 12/1968 | Fykes | 248/479 X |
| 3,694,051 | 9/1972 | Dian | 248/479 |
| 4,076,392 | 2/1978 | Suzuki | 248/481 X |

FOREIGN PATENT DOCUMENTS 2036818  1/1972  Fed. Rep. of Germany ........... 248/479

Primary Examiner—William H. Schultz
Attorney, Agent, or Firm—Lowe, King, Price & Becker

[57] ABSTRACT

There is disclosed a vehicle mirror construction for attachment to doors of vehicles, the construction comprising a mirror having a vertical line passing through the center of gravity of said mirror, a mirror mounting secured to said mirror on said vertical line or between said vertical line and one side of said mirror, and a balance weight secured to said mirror between said vertical line and a second side of said mirror.

5 Claims, 5 Drawing Figures

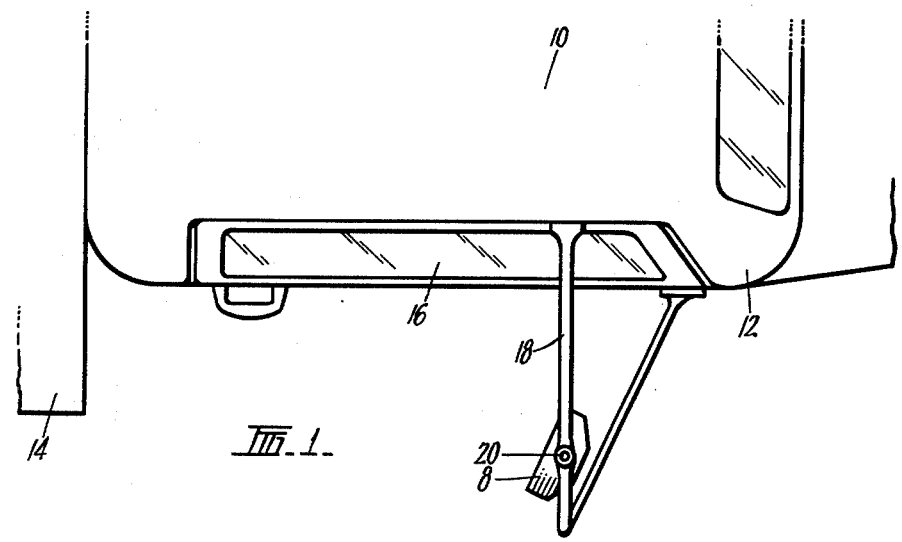
FIG. 1
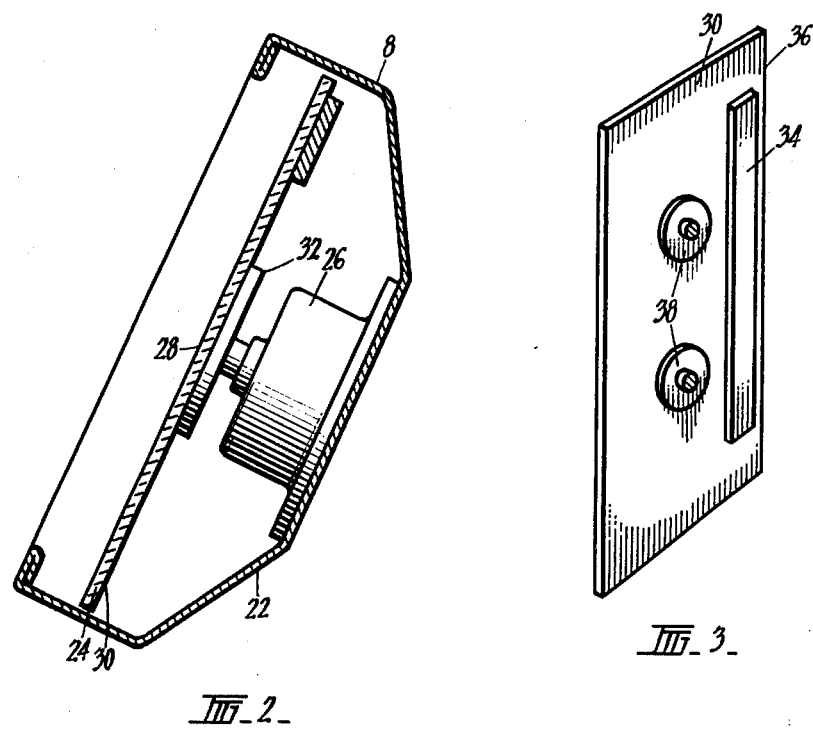
FIG. 2
FIG. 3

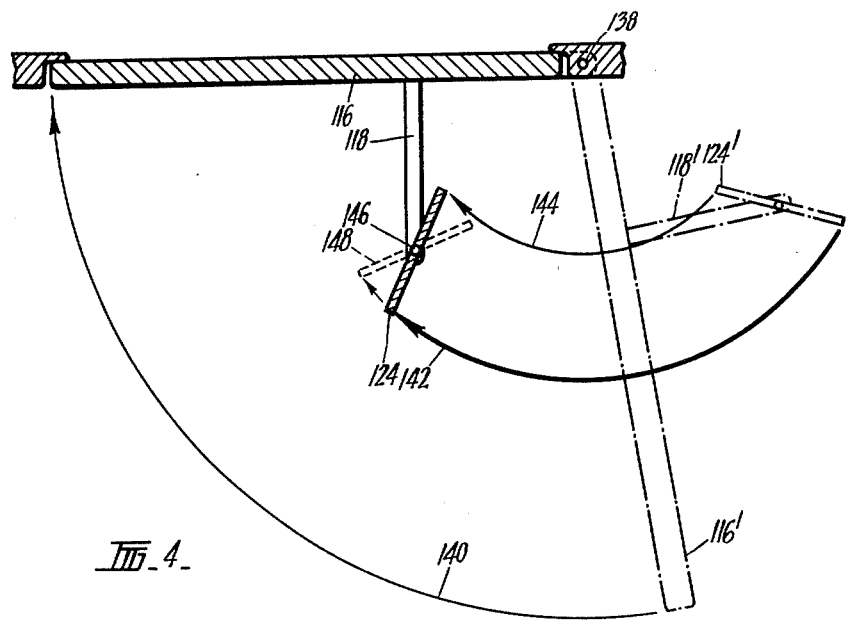
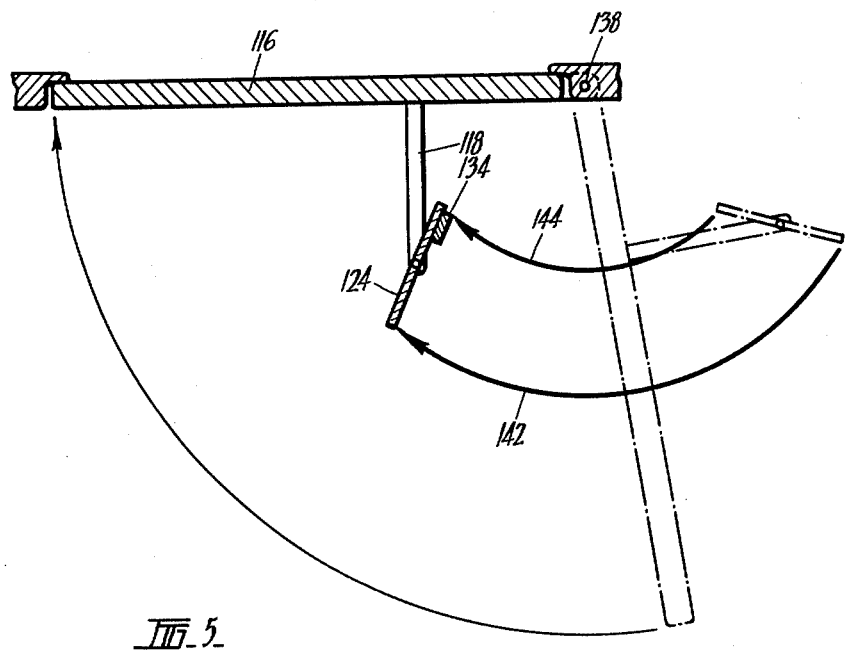

VEHICLE MIRRORS

This invention relates to vehicle mirrors and particularly, though not exclusively, to vehicle mirrors carried by support frames attached to the doors of such vehicles.

It has long been a requirement in most countries of the world that all motor vehicles be provided with a rear-vision mirror. For the convenience of the driver of such vehicles the rear-vision mirror is normally placed within the cabin of the vehicle with the line of vision being through a rear-window. However, with vehicles such as trucks and vans there is quite often no rear window and therefore the rear-vision mirror must be located externally to the vehicle cabin. When the van or truck cabin is of lesser width than the tray or rear portion of the truck or van then the mirror must be mounted on a frame so that it is spaced from the vehicle cabin. Most of these frames are attached to the door to the vehicle cabin.

The greatest problem that exists with these mirrors spaced away from the actual vehicle cabin is not only the movement of the frame relative to the door to which it is attached but also the movement of the actual mirrored surface relative to the frame. In Australian Patent Application No. 21322/77 filed Jan. 13, 1977, there is disclosed means whereby movement between the frame and the vehicle door can be controlled. Therefore, there still exists the problem of relative movement between the mirrored surface and the frame.

This problem has existed for very many years. There have been many attempts made to overcome the problem. None have worked. Most of the attempts at overcoming the problem were of the type requiring extra apparatus holding the mirror in place relative to the frame. This resulted in greater complexity of construction, greater manufacturing cost, and far greater difficulty in use of the actual mirror. Therefore, they have not met with commercial success. The reason for this is that none of them have appreciated the reason for the problem.

It is therefore the principal object of the present invention to provide vehicle mirrors, especially vehicle mirrors for attachment to the door of a vehicle by means of a frame, wherein the mirror will have significantly reduced accidental relative movement between the mirror and the frame.

With the above and other objects in mind, the present invention provides a vehicle mirror comprising a mirror having a vertical line passing through the centre of gravity of said mirror, a mirror mounting secured to said mirror on said vertical line or between said vertical line and one side of said mirror, and a balance weight secured to said mirror between said vertical line and a second side of said mirror.

The invention also provides a vehicle mirror comprising a mirror having a vertical line passing through the centre of gravity of said mirror, a mirror mounting secured to said mirror between said vertical line and one side of said mirror with the spacing of said mirror mounting from said vertical line being proportional to the distance of the mirror from the vehicle to which it is attached.

In order that the invention may be clearly understood and readily put into practical effect, there shall now be described by way of non-limitative example only a preferred construction of a vehicle mirror incorporating the features of the present invention, the description being with reference to the accompanying illustrative drawings. In the drawings:

FIG. 1 is a partial plan view of a vehicle mirror of the present invention fitted to a vehicle;

FIG. 2 is a sectional plan through the vehicle mirror of FIG. 1;

FIG. 3 is a rear perspective view of the mirror;

FIG. 4 is a schematic plan showing a vehicle mirror of conventional construction; and FIG. 5 is a view corresponding to FIG. 4 showing a vehicle mirror of the present invention.

To refer to the drawings and firstly to FIGS. 1 to 3, there is shown a motor vehicle 10 which in this case is a van and which has a cabin 12 and a body 14. As can be seen, the body 14 is of greater width than the cabin 12 and therefore there must be provided an exterior mirror assembly 8. The mirror assembly 8 is retained in position relative to the cabin 12 by means of a mounting frame 18 secured to the door 16 of the cabin 12. The assembly 8 is attached to the mounting frame 18 by means of a restricted pivotal connection 20. This is in accordance with standard practice.

The mirror assembly 8 comprises a housing 22 of any suitable shape and construction in accordance with the style of mirror contained therein. The housing contains a mirror 24 which has a mirrored surface 28 and a rear surface 30. The mirror in the present case is mounted to the plate 32 of an electrically operated remote control drive mechanism 26 which is secured to the housing 22. The electrically operated remote control drive mechanism is not an essential part of the assembly and may be replaced by, for example, a cable operated remote control assembly or a tight ball joint to enable direct movement of the mirror 24.

As can be seen, the mirror 24 is attached to the drive mechanism 26 with the vertical centre line of the mirror 24 passing through the longitudinal axis of the drive mechanism 26. Secured to the rear surface 30 of the mirror 24 adjacent a near side 36 thereof is a flat strip-like balance weight 34. The purpose of this balance weight will be understood from the description to come.

As can be seen from FIG. 3, and in accordance with the options described above, the mirror 24 may not be attached to a plate 32 of a remote control drive mechanism 26, but may be provided with two tight ball joints 38. The only requirement for the mounting of the mirror relative to the housing 22 is that the mirror must be movable in a plane about its vertical axis. There is no requirement that the mirror must be movable about its horizontal axis.

To refer now to FIGS. 4 and 5, there are shown schematically the reasons why the balance weight 34 is provided. In FIG. 4, there is shown the situation which arises with a conventional mirror. Here, the door 116 for a motor vehicle as attached thereto a mounting frame 118 which holds in place a mirror mechanism which includes a mirror 124. The door 116 pivots about a hinge 138. In broken outline, there are shown the door, mounting frame, and mirror assembly in the open position. When the door 116 is moved from the position designated 116' to the closed position shown, it moves in an arc about the hinge 138 with the outer edge of the door moving in the arc designated 140. As the mirror 124 is attached to the door 116 by means of a frame 118 the mirror will move from the position designated 124 to the position 124 with the centre of the movement being the hinge 138. The outer edge of the mirror 124 will move in the arc 142 whilst the inner edge will move in the arc 144. As the radius of arc 142 is greater than the radius of arc 144, the outer edge of mirror 124 which moves along arc 142 will move at a greater speed than the inner edge of mirror 142 moving along arc 144. Furthermore, when the door 116 slams shut, the mirror is stopped due to a force acting along the mounting frame 118. This force will act equally upon both the inner edge and outer edge of mirror 124. As the force is equal on both edges and as the mirror is mounted centrally and is of relatively uniform mass then the same rate of deceleration will be applicable to the two edges of the mirror. However, the momentum of the outer edge of mirror 124 will be greater than the momentum of the inner edge due to its higher speed. Therefore, the outer edge will take a greater distance to stop.

Due to the outer edge taking a greater distance to stop it will naturally move about a central point 146 and will come to rest at the position designated 148.

This is why a vehicle mirror attached to a frame secured to a vehicle door will move whenever the door is slammed shut—the higher speed at the outer edge of the mirror causes that outer edge to have a greater momentum than the inner edge and thus when the door is slammed shut the mirror will move. When the door is closed normally, the frictional forces within the mounting are sufficient to overcome the small differences in momentum and thus the mirror will not move. It is only when greater velocities are achieved that the difference in momentum becomes significant and beyond the frictional forces within the mirror mechanism.

To now refer to FIG. 5, it can be seen that the balance weight 34 has been placed on the rear surface 30 of the mirror. As the momentum of a particular object is equal to the product of the mass of the object and its velocity then it can be seen that by placing a greater mass at the inner edge 36 of the mirror 24 then the lesser speed (hence velocity) of the inner edge 36 may be compensated for so that the product is the same. Thus, as the momentum is the same and as the stopping force is the same, even when the door is slammed quite hard, the mirror 124 would not move relative to the frame 118. In this way, the problem is overcome.

The balance weight 34 may be secured to the rear surface 30 of the mirror 24 by any suitable means such as, for example, glueing or double sided adhesive tape. Furthermore, the balance weight may be in the form of a strip of metal as shown or a number of small circular or rectangular weights.

Furthermore, the mounting of the mirror relative to the drive mechanism 26 may be such that the vertical axis of the mirror is offset relative to the longitudinal axis of the mounting 26. The offset relationship would be such that the greater amount of the mirror mass would be on the inner side of the housing so that more of the mass of the mirror was between the mounting 26 and the door 16 than beyond the mounting 26. If the offset relationship was calculated exactly then there may not be the need for any balance weights at all. This would be due to the fact that the mass and velocity product for that part of the mirror on the inner side of the mount 26 would be the same as the mass and velocity product for that part of the mirror on the outer side of the mount 26. However, this form would require specialised constructions of housing 22 and is therefore not as desirable.

Thus, the overall effect of the invention is to provide an offset mounting of the overall mass structure of the mirror and balance weight so as to create an imbalance situation in normal circumstances but which imbalance situation resists a slam or closing force exerted upon the mirror upon the sudden closing of the door to which the mirror is eventually attached.

Whilst there has been described in the foregoing description a preferred construction of a vehicle mirror incorporating the features of the present invention, it will be understood by those skilled in the art that many variations or modifications in details of design or construction may be made without departing from the present invention as defined in the following claims.

I claim:

1. A mirror assembly for mounting on a vehicle door, said assembly comprising (a) a generally planar mirror having a vertical center line passing through the center of gravity of said mirror, said vertical line dividing said mirror into a first half nearer said vehicle door and a second half farther from said door, said mirror having a rear surface to which is secured a mirror mounting, said mirror mounting being centered on said vertical line or being secured to said second half, and (b) a generally flat balance weight secured to said first half of the rear surface of said mirror so as to create a static imbalance in said mirror which resists a slam force acting upon said mirror upon the rapid closing of said vehicle door.

2. The mirror assembly of claim 1 wherein said balance weight is a strip of a metal material.

3. The mirror assembly of claim 1 wherein said mirror mounting includes a plate secured to the rear surface of said mirror.

4. The mirror assembly of claim 3 wherein said plate is attached to a supporting structure by a tight friction pivot joint.

5. The mirror assembly of claim 3 wherein said plate is attached to a remotely controlled drive mechanism.

* * * * *